United States Patent Office 3,499,886
Patented Mar. 10, 1970

3,499,886
AZO DYES OF STARCH ANTHRANILATES AND PROCESS OF PREPARING SAME
Charles L. Mehltretter, Peoria, Ill., assignor to the United States of America as represented by the Secretary of Agriculture
No Drawing. Filed July 18, 1967, Ser. No. 654,273
Int. Cl. C08b 19/04; C13l 1/08
U.S. Cl. 260—233.5                                3 Claims

---

ABSTRACT OF THE DISCLOSURE

Starch-based azo dyes are obtained by diazotizing starch anthranilate esters and coupling the diazotized intermediate with a conventional aromatic coupling agent. Dispersions of the predominantly red high molecular weight dyes also contribute significant viscosity effects.

---

The invention relates to new azo dyestuffs which correspond to the general formula

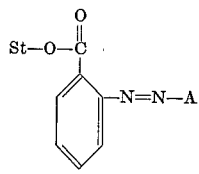

in which St is an anhydroglucose unit of starch in which AGU moiety a hydroxyl group has been esterified with isatoic anhydride to form a starch anthranilate, which anthranilate then is diazotized and coupled with A (in which A represents the residue of dimethyl aniline, 2-naphthol-6,8-disulfonic acid dipotassium salt, β-naphthol or of any other aromatic compound capable of coupling with the diazotized starch anthranilate under acidic, neutral or slightly alkaline conditions to form an azo dye). Starch anthranilates of varied degrees of substitution (D.S.) of the anthranilyl group can readily be prepared by reaction of the starch with isatoic anhydride as described in my copending application, S.N. 620,658 filed Mar. 6, 1967, the disclosure of which is hereby incorporated by reference. Such starch anthranilates in the intact granule form are readily diazotized in known manner and then reacted with an appropriate coupling agent to produce predominantly deeply red to orange-red monoazo, disazo, or trisazo dyestuffs having the intact starch granule form. It is, of course, also possible to first diazotize any appropriate aromatic amine and then couple it with the starch anthranilate which, however, is not the preferred manner of dye formation.

The azo dyestuffs of this invention contain high molecular weight polyhydroxy residues that are chemically bound through mono-ester linkages to the dyestuff radicals. The high molecular weight polyhydroxy residues are the residues obtained after reaction of a small percentage of the hydroxyl groups of corn starch, wheat starch, potato starch, cationic starch, high amylose corn starch, hydroxyethylated starch, hypochlorite oxidized starch, or acid modified starch with isatoic anhydride to yield the corresponding anthranilic acid esters in granule form, which esters are then coupled with the various coupling agents to produce the azo dyestuffs in the granule form of the starch derivative. The extent of esterification produced for the purpose of the invention corresponds to an average degree of substitution of between 0.01 to 0.1 of anthranilyl groups per molecule of starch.

The dyestuffs of this invention are substantive to polyester, polyamide, and other synthetic fibers as well as to fiberglass and to cellulosic fibers. Thus, they can be used as pigments or dyes in a wide diversity of industrial applications including the preparation of completely colored films. Furthermore, when cooked dispersions are employed in printing ink formulations, my novel derivatives provide a unique and particularly beneficial combination of coloration and viscosity effects.

When heated above 60° C. in water, the azo dyestuffs of this invention form viscous dispersions or solutions of a colloidal nature, which are useful for the manufacture of colored shaped articles and fibers, films and foams. The azo dyestuffs of this invention may also be pregelatinized in the usual way on hot rolls whereat they become cold-water soluble for various applications.

The following examples illustrate the invention.

EXAMPLE 1

One hundred grams of starch anthranilate of D.S. 0.025, made in accordance with the procedure of Example 5 of S.N. 620,658, were stirred in 150 ml. of water and 1.10 g. of sodium nitrate dissolved in 10 ml. of water were added. Chopped ice was added to provide a temperature of 0°–10° C., and then 4 ml. of 4 N hydrochloric acid were introduced into the stirred mixture until the purple color of the potassium iodide starch reaction appeared. To the diazotized starch anthranilate mixture was then added a dilute hydrochloric acid solution containing 1.93 g. of dimethylaniline. After 4 hours of stirring at room temperature, the reacted mixture was adjusted to pH 8 with 0.5 N sodium hydroxide added dropwise. It was then stirred ½ hour at room temperature, filtered, washed with water and then with acetone before drying at 40° C.

Yield: 95.8 g. of granular orange-red dye.

A 3-percent water dispersion was made with this dye by cooking 3 g. in 97-ml. water at 100° for 5 to 10 minutes. When sufficiently cooled, the viscous dispersion was cast onto a polished steel plate and air dried. An orange-red colored starch film was obtained.

When, in this example, other coupling agents were substituted for the dimethylaniline, differently colored dyestuffs were obtained, for example

| Coupling agent: | Dye color |
|---|---|
| Meta-phenylene diamine | Red |
| 2-naphthol-6,8-disulfonic acid | Orange |
| 4,5-dihydroxy-2,7-naphthalene-disulfonic acid | Deep pink |
| 2-naphthol | Orange-yellow |

EXAMPLE 2

One-hundred grams of starch anthranilate of D.S. 0.10, made in accordance with the procedure of Example 3 of S.N. 620,658, were stirred in 150 ml. of water and a solution of 4.3 g. of sodium nitrite in 20 ml. of water was added. Chopped ice was then added to reach a temperature between 0° and 10° C. and then gradually 16 ml. of 4 N hydrochloric acid, until the potassium iodide starch reaction occurred. A solution of 7.65 g. of dimethylaniline dissolved in 16 ml. of 4 N hydrochloric acid was then introduced and the dye mixture was stirred for 4½ hours at room temperature at pH 3. The mixture was then neutralized to pH 8 with gradual addition of dilute sodium hydroxide solution and stirred for ½ hour. It was then filtered, washed with water and finally with acetone, and dried at 40°.

Yield: 104 g. of orange-red dye in unmodified starch granule form.

EXAMPLE 3

Fifty grams of hydroxyethylated starch anthranilate (D.S. 0.025), prepared in the manner of Example 5 of S.N. 620,658 excepting that the ordinary corn starch was replaced by a proprietary hydroxyethylated starch, i.e., "Penford Gum 280," were stirred in 75 ml. of water and a solution containing 0.53 g. of sodium nitrite in 5 ml. of water was added. After cooling to 0–5° C., 2 ml. of 4 N hydrochloric acid was added. A solution of 0.84 g. of meta-phenylene diamine dissolved in 10 ml. of 4 N hydrochloric acid was added, and the reaction mixture was stirred at room temperature for 5 hours. The product was then filtered, washed with water several times, finally washed with acetone, and then dried at 40° C.

Yield: 49 g. granules of orange-red dye.

Fifty-gram quantities of anthranilates of the other starches shown below having a D.S. of 0.025 were diazotized and reacted as above with meta-phenylene diamine.

| Anthranilate of— | Yield (g.) | Dye color |
|---|---|---|
| Acid modified corn starch (Eagle Brand 5082) | 48 | Red |
| Cationic starch (Cato 8) | 49 | Red |
| Hypochlorite oxidized starch (Clearsol XX) | 49 | Red |
| High amylose corn starch (Amylon-7) | 50 | Red |

EXAMPLE 4

Fifty grams of ordinary corn starch anthranilate (D.S. 0.06) were stirred in 100 ml. of water and 10 ml. of water containing 1.10 g. of sodium nitrite was added. After cooling to 0–5° C., 4 ml. of 4 N hydrochloric acid was added. A solution of 12.33 g. of 4,5-dihydroxy-2,7-naphthalene disulfonic acid disodium salt dihydrate dissolved in 50 ml. of $H_2O$ and neutralized to pH 7.0 with sodium bicarbonate was added, and the mixture was stirred at room temperature for 4 hours before it was filtered, washed with water several times, then with acetone, and finally dried at 40° C.

Yield: 49.7 g. bright red dye.

A nonexclusive, irrevocable, royalty-free license in the invention herein described, throughout the world for all purposes of the United States Government, with the power to grant sublicenses for such purposes, is hereby granted to the Government of the United States of America.

I claim:

1. Water dispersible azo dyes formed by the diazotization of a starch anthranilate ester in intact granule form and having an anthranilate D.S. of 0.025–0.1 followed by reaction of the diazotized intermediate with an aromatic coupling compound selected from the group consisting of dimethylaniline, m-phenylene diamine, β-naphthol, 2-naphthol-6,8-disulfonic acid dipotassium salt, and 4,5-dihydroxy-2,7-naphthalene-disulfonic acid, said azo dyes having the general formula

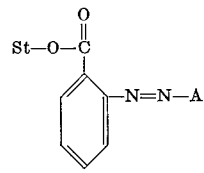

wherein St is an anhydroglucose residue of starch and A is the residue of an above defined aromatic coupling compound.

2. Cooked aqueous dispersions of the azo dyes as defined in claim 1.

3. An air-dried film exhibiting an orange-red coloration uniformly throughout, said film being prepared by casting a cooked aqueous dispersion of an azo dye as defined in claim 1 wherein the aromatic coupling agent is dimethylaniline.

References Cited

UNITED STATES PATENTS

| 2,150,968 | 3/1939 | Guenther | 260—214 |
| 2,926,063 | 2/1960 | Reeves et al. | 8—116.2 |

DONALD E. CZAJA, Primary Examiner

M. I. MARQUIS, Assistant Examiner

U.S. Cl. X.R.

117—165; 260—201, 202, 207.1, 233.3